United States Patent Office 3,646,105
Patented Feb. 29, 1972

3,646,105
POLYCYCLIC POLYENE HYDROCARBONS AND PROCESS FOR THE PREPARATION THEREOF
Sebastiano Cesca, Arnaldo Roggero, Aldo Priola, and Ermanno Cinelli, San Donato Milanese, Italy, assignors to Snam Progetti S.p.A., Milan, Italy
No Drawing. Filed Dec. 18, 1969, Ser. No. 886,289
Claims priority, application Italy, Dec. 18, 1968, 25,240/68
Int. Cl. C07c 13/28
U.S. Cl. 260—666 PY
6 Claims

ABSTRACT OF THE DISCLOSURE

New termonomers are disclosed which are represented by the formula:

A—(CH$_2$)$_n$)— wherein A is a radical including at least one ring having an endomethylene group, B is a cyclodiene radical and $n$ is 0–5.

---

This invention relates to polycyclic polyene hydrocarbons and to a process for preparing the same.

According to one aspect of the present invention, there is provided a polycyclic polyene hydrocarbon having the following general formula:

A—(CH$_2$)$_n$—B in which A is a radical comprising at least one ring having an endomethylene group, B is a cyclodiene radical and $n$ is 0 or an integer from 1 to 5.

Examples of the radical A include those having the following formulae:

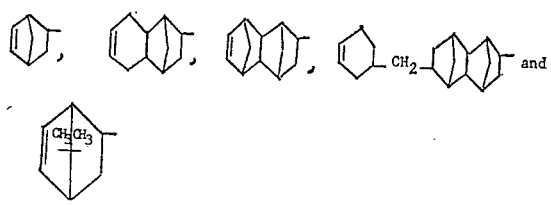

Examples of the radical B include those having the following formulae:

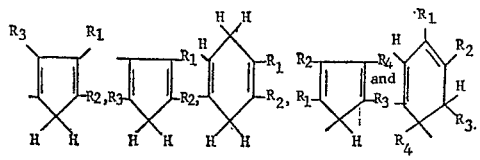

wherein each of $R_1$, $R_2$, $R_3$ and $R_4$, which may be the same or different, is a hydrogen atom or an alkyl radical having from 1 to 5 carbon atoms.

The hydrocarbons of the invention may be prepared, for example, according to the following equation:

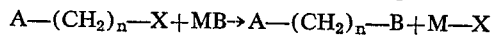

wherein A and B are as defined above and X represents a halogen atom, e.g. chlorine, bromine, or iodine, and M is an alkali metal, e.g. sodium or potassium.

Alternatively, the preparation of the hydrocarbons according to the present invention may be effected in accordance with the following equation:

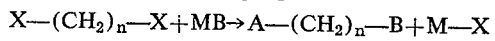

wherein A, B, X and M are as hereinbefore defined.

The reaction is generaly carried out at room temperature or slightly higher than room temperature, for example in the range from 15° to 100° C., the higher temperature promoting the dissolution of the reagents.

Preferably use is made of a solvent, which may be selected from, for example, ethers e.g. tetrahydrofuran, dioxane, diglyme,[1] diethyl ether and dibutyl ether, or from aromatic hydrocarbons, e.g. benzene, toluene, xylenes and mixtures of these solvents.

The reaction is preferably conducted in an inert gas atmosphere, e.g. nitrogen or argon. The reagents are preferably employed in amounts similar to those required by the reaction stoichiometry, although use may be made of an excess of one of the reagents.

The separation of the polycyclic hydrocarbon from the mixture of reaction products does not entail difficulties. In fact, usual processes may be employed, for example distillation, rectification and crystallization.

In addition, certain of the desired products can be produced by reacting other compounds according to the present invention in an aromatic solvent, either alone or with cyclopentadiene.

The present invention will now be illustrated by the following examples. The formulae of some of the products of the examples are given in the following table, which exemplifies products of the invention.

---

[1] Diglyme=diethylen glycol dimethyl ether.

TABLE

| | | |
|---|---|---|
| I |  | (2-norborn-5-enyl)-[4' or 5'-(2' or 3'-methyl)-cyclopentadienyl]-methane. |
| II |  | (2-norborn-5-enyl)-[4' or 5'-(1', 2' or 3' dimethyl)-cyclopentadienyl]-methane. |
| III | | (2-norborn-5-enyl)-(4' or 5'-cyclopentadienyl)-methane. |

TABLE—Continued

| | Structure | Name |
|---|---|---|
| IV | (norbornenyl)-CH₂-CH₂-CH₂-(cyclopentadienyl) | 1''-(2-norborn-5-enyl)-3''-(4' or 5'-cyclopentadienyl)-propane. |
| V | (norbornenyl)-CH₂-(cyclopentadienyl) | (2-norborn-5-enyl)-(1'-cyclopentadienyl)-methane. |
| VI | (norbornenyl)-CH₂-(methylcyclohexadienyl) | (2-norborn-5-enyl)-[6'-(2' or 3'-methyl)-cyclohexadienyl-2', 5']-methane. |
| VII | (octahydronaphthalenyl)-CH₂-(cyclopentadienyl) | [bis-(1, 4-5, 8-endomethylen)-7-(1,4,5,6,7,8, 9,10-octahydro)-naphthalenyl]-(4' or 5'-cyclopentadienyl)-methane. |
| VIII | (norbornenyl)-CH₂-(octahydronaphthalenyl)-CH₂-(cyclopentadienyl) | 2-(2'-methylen-norborn-5'-enyl)-7-(4'' or 5''-methylen-cyclopentadienyl)-[bis-(1,4-5,8-endomethylen)-1,4,5,6,7,8,9,10-octahydro]-naphthalenyl. |
| IX | norbornenyl-cyclopentadienyl | 3-norborn-5-enyl-4' or 5'-cyclopentadienyl. |
| X | norbornenyl-(methylcyclopentadienyl) | 3-norborn-5-enyl-1'-(4' or 5'-methyl)-cyclopentadiene. |
| XI | norbornenyl-(methylcyclopentadienyl) | 3-norborn-5-enyl-4' or 5'-(2' or 3'-methyl)-cyclopentadiene. |

Air was removed from a three-necked 500 ml. flask fitted with a stirrer, a dropping funnel and a reflux condenser. Then the flask was filled with nitrogen and 0.3 mole of potassium methylcyclopentadiene in 300 ml. of anhydrous tetrahydrofuran was introduced into the flask. After heating the contents of the flask to 65°–70° C. in order to dissolve the potassium derivative, 0.4 mole of 2-bromoethyl-norbornene-5 in 100 ml. of tetrahydrofuran were added dropwise to the flask. The reaction did not take place immediately and the precipitation of KBr appeared after some tens of minutes. After 10 hours, the resulting reaction mass was decomposed by diethyl alcohol, and water was added. The two layers were decanted and the aqueous layer was repeatedly extracted with diethyl ether, in order to recover all the reaction products. After drying the collected ethereal extracts on $Na_2SO_4$, the solvents were removed and the resulting product was fractionated. The following fractions were obtained.

1st fraction=10.1 g.; B.P. at 0.01 torr of up to 42° C.; 30% gas chromatographic purity (G.C.)
2nd fraction=31 g. B.P. at 0.01 torr of up to 48° C.; 99% gas chromatographic purity (G.C.)
3rd fraction=18.4 g.; B.P. at 0.01 torr of up to 48–50° C.; 70% has chromatographic purity (G.C.)

The total yield calculated on the reacted bromine derivative was 88%. Mass spectrometry confirmed the molecular weight (M.W.) of the expected compound at 186; $n_D^{20}$=1.5235. Upon IR examination, the absorption $\nu C{=}C$ appeared at 1568 cm.$^{-1}$; this is a characteristic of a double bond in a norbornene ring.

NMR analysis showed a chemical shift at 81 cps., characteristic of an endomethylene group; furthermore, the ratio between the areas of the signals corresponding to the saturated and unsaturated protons, coincided with the value estimated on the basis of Formula I in the table. On U.V. examination the absorption typical of the conjugated double bonds of the cyclopentadiene ring appeared at 250 m$\mu$.

EXAMPLE 2

The procedure of Example 1 was repeated, but this time employing sodium methyl cyclopentadiene which, unlike the corresponding potassium derivative, is soluble in tetrahydrofuran at room temperature. Using the same apparatus, 0.2 mole of the sodium derivative and 0.2 mole of 2-bromo, methyl-5-norbornene were reacted at room temperature for 20 hours. Following the previous procedure, the following fractions were obtained.

1st fraction=4.92 g.; B.P. at 0.01 torr of up to 42° C.; 30% G.C. purity;
2nd fraction=29.3 g.; B.P. at 0.01 torr of up to 48° C.; 99% G.C. purity;
3rd fraction=6.83 g.; B.P. at 0.01 torr of from 48 to 114° C.; 20% G.C. purity.

The calculated yield on the reacted bromoethylnorbornene was about 90%.

EXAMPLE 3

Using the apparatus and the procedure of Example 1, 0.2 mole of sodium cyclopentadiene and 0.2 mole of 2-bromo, methyl-5-norbornene in 400 ml. of tetrahydrofuran were reacted at room temperature for a period of 20 hours. The following fractions were obtained.

1st fraction=18.3 g.; B.P. at 0.01 torr of up to 42° C.; 10% G.C. purity;
2nd fraction=9.3 g.; B.P. at 0.01 torr of up to 44° C.; 95% G.C. purity;
3rd fraction=9.5 g.; B.P. at 0.01 torr of up to 44° C.; 95% G.C. purity;
4th fraction=9.1 g.; B.P. at 0.01 torr of up to 56° C.; 95% G.C. purity;

The fraction 4 was isolated by heating the bath up to a temperature near 190 C., whereas for the other fractions the boiler temperature was 120° C.

The reaction yield calculated on 2-bromoethyl-5-norbornene was about 86.7%. Mass spectroscopy showed a M.W. of 172.

U.V. examination showed an absorption at 251.6 m$\mu$, characteristic of the conjugated double bonds of the cyclopentadiene ring.

During NMR analysis, the "chemical shift" appeared at 70 cps., characteristic of the endomethylene group of a norbornene structure; furthermore, the ratio between the areas of the signals corresponding to saturated and unsaturated protons is the same as the value estimated on the basis of Formula III in the table, within the limits of the product purity.

IR examination showed the absorption $\nu C=C$ at 1568 cm.$^{-1}$, characteristic of a double bond in a norbornene ring.

EXAMPLE 4

Employing the apparatus and the procedure of the preceding example, 0.2 mole of sodium-cyclopentadiene was reacted with 0.2 mole of 2-chloromethyl-5-norbornene in 400 ml. of tetrahydrofuran. At room temperature the precipitate did not form, but sodium chloride began to separate upon heating under reflux. The boiling of the solvent was continued for 40 hours. Then the reaction mass was decomposed with water and the product was extracted according to the usual procedure, using diethyl ether. The following fractions were obtained.

1st fraction=10 g.; B.P. at 0.01 torr of up to 42° C.; 10% G.C. purity;
2nd fraction=6.25 g.; B.P. at 0.01 torr of up to 44° C.; 90% G.C. purity;
3rd fraction=5 g.; B.P. at 0.01 torr of up to 44° C.; >95% G.C. purity;
4th fraction=6.30 g.; B.P. at 0.01 torr of up to 56° C.; >95% G.C. purity.

The 4th fraction was isolated by heating the bath to a temperature near 190° C., whereas for the isolation of other fractions the boiler temperature was 120° C.

The yield calculated on the 2-chloromethyl-5-norbornene was about 51.5%. The product was compound III shown in the table.

EXAMPLE 5

Following the procedure described in Example 1, 0.3 mole of sodium cyclopentadiene was reacted with 0.3 mole of dehydronorbonyl chloride in 500 ml. of tetrahydrofuran. After 6 hours reflux heating there was still no precipitate. The solution was transferred to an air-free stainless steel autoclave and heated for 14 hours at 150° C. A NACl precipitate formed. The mass of organic product was decomposed, the product was extracted in the usual manner, and the following fractions were obtained.

1st fraction=23.3 g.; B.P. at 0.01 torr of up to 35° C.; 10% G.C. purity;
2nd fraction=11.7 g.; B.P. at 0.01 torr of up to 36-38° C.; 85% G.C. purity;
3rd fraction=12 g.; B.P. at 0.01 torr of up to 38-42° C.; 40% G.C. purity.

A large residue remained, consisting of high boiling-point oil products.

The yield calculated on the dehydronorbornyl chloride was about 40%.

The product was identified by physico-chemical analysis and it showed an absorption typical of the product of Formula IX in the table.

EXAMPLE 6

0.3 mole of the product having Formula III are made to react in benzene solution for 4 hours. After removing preliminarily the solvent and then, under high vacuum, about 10% of unreacted compound of Formula III, a viscous product was isolated which had a M.W. of 344. By physico-chemical analysis, the product was found to agree with the Formula VIII in the table.

EXAMPLE 7

The procedure of the Example 6 was followed, except that 0.3 mole of III was reacted with 0.9 mole of monocyclopentadiene added in four separate consecutive portions. Preliminarily benzene and then dicyclopentadiene were isolated; and then a product was obtained having a M.W. of 238, of which corresponded to the Formula VII in the table.

The compounds of the present invention may be employed as thermomonomers in preparing terpolymers or as intermediates in organic synthesis. Such terpolymers are described and claimed in the related patent application, Ser. No. 886,390 filed on Dec. 18, 1969 by us and one other person.

What we claim is:

1. A polycyclic polyene hydrocarbon having the following general formula:

wherein A is a radical selected from the group represented by one of the following formula group:

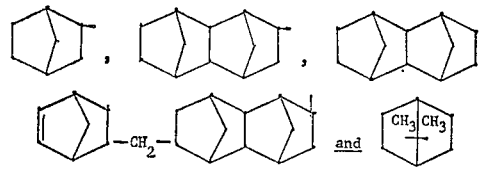

B is a cyclodiene radical selected from the group represented by one of the following formula:

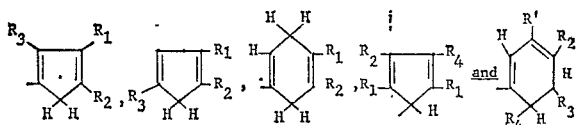

wherein each of $R_1$, $R_2$, $R_3$ and $R_4$, which may be the same or different, is a hydrogen atom or an alkyl radical having from 1 to 5 carbon atoms, and $n$ is 0 or an integer from 1 to 5.

2. A process for preparing a polycyclic polyene hydrocarbon as claimed in claim 1, which comprises reacting a compound having the formula A—$(CH_2)_n$—X with a compound having the formula MB, wherein A, B and $n$ are as defined in claim 1, X represents a halogen atom and M is an alkali metal atom.

3. A process for preparing a polycyclic polyene hydrocarbon as claimed in claim 1, which comprises reacting a compound having the formula X—$(CH_2)_n$—B with a compound having the formula MA, wherein A, B and $n$ are as defined in claim 1, X represents a halogen atom and M is an alkali metal atom.

4. A process according to claim 2, wherein the reaction is effected in the presence of a solvent which is an aliphatic ether or an aromatic hydrocarbon.

5. A process according to claim 2, which further comprises heating the hydrocarbon product in an aromatic solvent in order to introduce additional rings into the hydrocarbon molecule.

6. A process according to claim 5, wherein the further reaction is effected in the presence of cyclopentadiene.

References Cited

UNITED STATES PATENTS

| | | | |
|---|---|---|---|
| 3,144,491 | 8/1964 | O'Connor et al. | 260—666 |
| 3,345,419 | 10/1967 | Tinsley et al. | 260—617 |
| 3,183,220 | 5/1965 | Dekking | 260—88.2 |

PAUL M. COUGHLAN, JR., Primary Examiner

V. O'KEEFE, Assistant Examiner

U.S. Cl. X.R.

260—666 A

PO-1050
(5/69)

UNITED STATES PATENT OFFICE
CERTIFICATE OF CORRECTION

Patent No. 3,646,105      Dated February 29, 1972

Inventor(s) Sebastiano Cesca, Arnaldo Roggero, et al

It is certified that error appears in the above-identified patent and that said Letters Patent are hereby corrected as shown below:

Column 1, line 8, correct "886,289" to read --886,389--.

line 17, correct the formula to read --

$$A - (CH_2)_n - B$$

Column 2, line 21, correct the equation to read --

$$X - (CH_2)_n - B + MA \longrightarrow A - (CH_2)_n - B + M - X,$$

Column 4, line 57, change "at" to --as--.

Column 6, line 44, correct the spelling of --termonomers--.

Signed and sealed this 19th day of February 1974.

(SEAL)
Attest:

EDWARD M. FLETCHER, JR.
Attesting Officer

C. MARSHALL DANN
Commissioner of Patents